(12) United States Patent
Choi et al.

(10) Patent No.: US 11,453,237 B2
(45) Date of Patent: Sep. 27, 2022

(54) OMNI-DIRECTIONAL WHEEL AND MOVING DEVICE INCLUDING THE SAME

(71) Applicant: SAMSUNG ELECTRONICS CO., LTD., Suwon-si (KR)

(72) Inventors: Wonjun Choi, Suwon-si (KR); Jaewook Lee, Suwon-si (KR); Jongsik Won, Suwon-si (KR); Jaewon Yoo, Suwon-si (KR); Jungdae Heo, Suwon-si (KR); Seungbohm Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 16/672,749

(22) Filed: Nov. 4, 2019

(65) Prior Publication Data
US 2020/0147998 A1 May 14, 2020

(30) Foreign Application Priority Data
Nov. 14, 2018 (KR) .......................... 10-2018-0140092

(51) Int. Cl.
*B60B 19/00* (2006.01)
*B60B 19/12* (2006.01)
(52) U.S. Cl.
CPC ............ *B60B 19/003* (2013.01); *B60B 19/12* (2013.01); *B60B 2900/351* (2013.01)
(58) Field of Classification Search
CPC ........................... B60B 19/003; B60B 19/125
See application file for complete search history.

(56) References Cited

U.S. PATENT DOCUMENTS

| 8,011,735 | B2 * | 9/2011 | Scogna ................. B60B 19/125 |
| | | | 301/5.23 |
| 8,863,794 | B2 | 10/2014 | Wichern |
| 9,365,076 | B2 * | 6/2016 | Bando ..................... B60B 19/12 |
| 9,834,036 | B2 | 12/2017 | Winshtein et al. |

(Continued)

FOREIGN PATENT DOCUMENTS

| CN | 206856399 U | 1/2018 |
| CN | 2071063035 U | 3/2018 |

(Continued)

OTHER PUBLICATIONS

Communication dated Apr. 2, 2020, from the European Patent Office in counterpart European Application No. 19208564.5.

*Primary Examiner* — Jason R Bellinger
(74) *Attorney, Agent, or Firm* — Sughrue Mion, PLLC

(57) ABSTRACT

An omni-directional wheel includes: a center wheel configured to rotate about a first rotation axis extending in a first direction; a plurality of peripheral wheels arranged along a circumference of the center wheel and configured to rotate about a second rotation axis extending in a second direction different from the first direction; and a plurality of variable supports provided on the center wheel and configured to respectively support the plurality of peripheral wheels. At least one of the plurality of variable supports is configured to absorb, when an impact force is applied to at least one of the plurality of peripheral wheels being supported by the at least one of the plurality of variable supports, the impact by changing a distance between the center wheel and the at least one of the plurality of peripheral wheels.

20 Claims, 19 Drawing Sheets

(56) References Cited

U.S. PATENT DOCUMENTS

| | | |
|---|---|---|
| 2010/0072807 A1 | 3/2010 | Wichem |
| 2014/0232174 A1* | 8/2014 | Zdrahal ................ B60B 33/045 |
| | | 301/5.23 |
| 2015/0174957 A1 | 6/2015 | Brazier et al. |
| 2017/0087932 A1 | 3/2017 | Winshtein et al. |
| 2018/0050563 A1 | 2/2018 | Zhang et al. |
| 2020/0094617 A1 | 3/2020 | Wang et al. |

FOREIGN PATENT DOCUMENTS

| | | |
|---|---|---|
| ER | 2871066 A1 | 5/2015 |
| KR | 10-1133994 B1 | 4/2012 |
| KR | 10-1133996 B1 | 4/2012 |
| KR | 10-1812570 B1 | 12/2017 |

* cited by examiner

OMNI-DIRECTIONAL WHEEL AND MOVING DEVICE INCLUDING THE SAME

CROSS-REFERENCE TO RELATED APPLICATION

This application is based on and claims priority under 35 U.S.C. § 119 to Korean Patent Application No. 10-2018-0140092, filed on Nov. 14, 2018, in the Korean Intellectual Property Office, the disclosure of which is incorporated herein by reference in its entirety.

BACKGROUND

1. Field

The disclosure relates to omni-directional wheels and moving devices including the same.

2. Description of Related Art

An omni-directional wheel includes a rotating center wheel and peripheral wheels arranged around the center wheel and being rotatable with respect to an axis extending in a different direction than an extending direction of a rotational axis of the center wheel.

A moving device including the omni-directional wheel is capable of moving in forward and rearward directions as well as moving in left and right directions and performing yawing motion by continuously rotating in a position without changing the rotational axis of the center wheel.

SUMMARY

Provided are an omni-directional wheel having improved impact resistance and a moving device including the omni-directional wheel.

Provided are an omni-directional wheel and a moving device including the same, which are configured to improve flexibility in selecting a wide range of materials of a peripheral wheel therein, have a lightweight design, and facilitate replacement of parts.

According to an embodiment of the disclosure, an omni-directional wheel includes: a center wheel configured to rotate about a first rotation axis extending in a first direction; a plurality of peripheral wheels arranged along a circumference of the center wheel and configured to rotate about a second rotation axis extending in a second direction different from the first direction; and a plurality of variable supports provided on the center wheel and configured to respectively support the plurality of peripheral wheels. At least one of the plurality of variable supports is configured to absorb, when an impact force is applied to at least one of the plurality of peripheral wheels being supported by the at least one of the plurality of variable supports, the impact by changing a distance between the center wheel and the at least one of the plurality of peripheral wheels.

Each of the plurality of variable supports may include: a support frame extending in a direction away from the first rotation axis of the center wheel and supporting rotation of a peripheral wheel of the plurality of peripheral wheels; and an elastic part configured to exert an elastic force to the support frame in a direction away from the first rotation axis of the center wheel.

The center wheel may include a plurality of first grooves, each of the plurality of first grooves configured to receive at least a portion of the support frame.

The support frame may include: an insertion portion being inserted into a first groove of the plurality of first grooves; and a protrusion portion extending from the insertion portion in the direction away from the first rotation axis of the center wheel and protruding outward from the insertion portion.

A first side surface of the insertion portion and a second surface of the first groove facing the first side surface of the insertion portion are parallel in a direction in which the protrusion portion extends from the insertion portion. A width of the first groove corresponds to a thickness of the insertion portion.

The support frame may further include a rib provided on the protrusion portion.

The support frame may further include a stopper configured to prevent separation of the support frame from the first groove of the center wheel.

The elastic part may include at least one of rubber or a fluid.

The elastic part may be positioned to support an end portion of the support frame facing the first rotation axis of the center wheel.

The elastic part may include a single body configured to exert the elastic force to the support frame of each of the plurality of variable supports.

The center wheel may further include a second groove into which the elastic part is inserted.

A material of the center wheel may be different from that of the support frame.

The support frame may have a strength greater than that of the center wheel.

According to another embodiment of the disclosure, a moving device includes a moving body; and a plurality of omni-directional wheels arranged along a periphery of the moving body to move the moving body in multiple directions. Each of the plurality of omni-directional wheels may include: a center wheel configured to rotate about a first rotation axis extending in a first direction; a plurality of peripheral wheels arranged along a circumference of the center wheel and configured to rotate about a second rotation axis extending in a second direction different from the first direction; and a plurality of variable supports provided on the center wheel and configured to respectively support the plurality of peripheral wheels. At least one of the plurality of variable supports is configured to absorb, when an impact force is applied to at least one of the plurality of peripheral wheels being supported by the at least one of the plurality of variable supports, the impact by changing a distance between the center wheel and the at least one of the plurality of peripheral wheels.

A first omni-directional wheel of the plurality of omni-directional wheels may be arranged symmetrically with a second omni-directional wheel of the plurality of omni-directional wheels with respect to the moving body.

Each of the plurality of variable supports may include: a support frame extending in a direction away from the first rotation axis of the center wheel and supporting rotation of a peripheral wheel of the plurality of peripheral wheels; and an elastic part configured to exert an elastic force to the support frame in a direction away from the first rotation axis of the center wheel.

The center wheel may include a plurality of first grooves, each of the plurality of first grooves configured to receive at least a portion of the support frame.

The support frame may include: an insertion portion being inserted into a first groove of the plurality of first grooves; and a protrusion portion extending from the insertion portion in the direction away from the first rotation axis of the center wheel and protruding outward from the insertion portion.

A first side surface of the insertion portion and a second surface of the first groove facing the first side surface of the insertion portion may be parallel in a direction in which the protrusion portion extends from the insertion portion, and wherein a width of the first groove corresponds to a thickness of the insertion portion.

The elastic part may include at least one of rubber or a fluid.

According to an embodiment of the disclosure, an omni-directional wheel includes: a center wheel configured to rotate about a first axis extending in a first direction; a plurality of peripheral wheels arranged along a circumference of the center wheel and configured to rotate about a second axis extending in a second direction different from the first direction in a plan view of the omni-directional wheel; and a plurality of variable supports provided on the center wheel and configured to support the plurality of peripheral wheels in a one-to-one ratio. Based on an impact force being applied to at least one of the plurality of variable supports, at least on variable support supporting the at least one of the plurality of variable supports is configured to absorb the impact force via an elastic force of the at least on variable support.

Each of the plurality of variable supports may include: a frame supporting rotation of a peripheral wheel of the plurality of peripheral wheels; and an elastic part configured to exert the elastic force to the frame in the direction away from the first axis of the center wheel.

The elastic part may include a rubber pad or a spring.

The impact force may be applied in a first radial direction toward the first axis of the center wheel and the elastic force is exerted in a second radial direction opposite to the first radial direction.

BRIEF DESCRIPTION OF THE DRAWINGS

The above and/or other aspects, features, and advantages of embodiments of the disclosure will be more apparent from the following description taken in conjunction with the accompanying drawings, in which.

DETAILED DESCRIPTION

Figure 1:
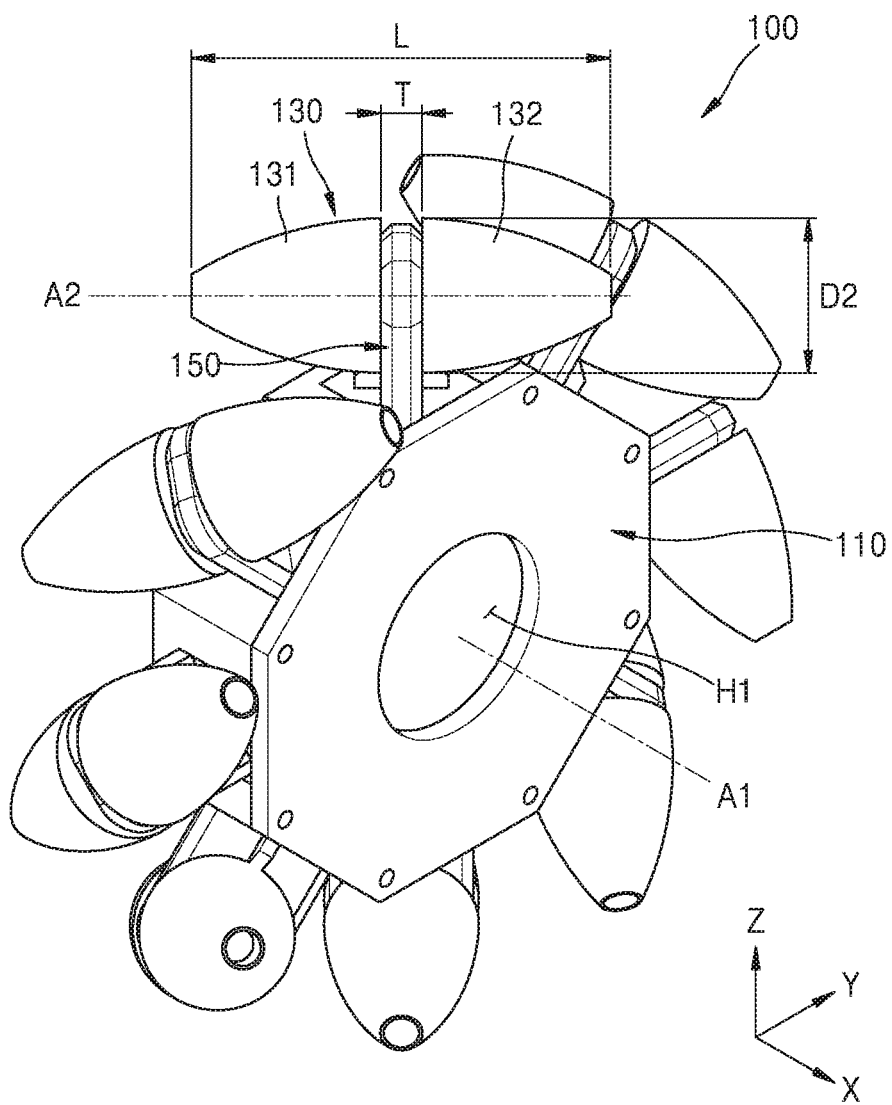
FIG. 1 is a perspective view of an omni-directional wheel according to an embodiment of the disclosure.

Configurations and operations according to embodiments of the disclosure will be described in detail with reference to the accompanying drawings.

Terms used herein will now be briefly described and then one or more embodiments of the disclosure will be described in detail.

The terms used in the specification are general terms currently widely used in the art based on functions described in embodiments of the disclosure, but may have different meanings according to an intention of one of ordinary skill in the art, precedent cases, or advent of new technologies. Furthermore, some terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Throughout the specification, when a part "includes" or "comprises" an element, unless there is a particular description contrary thereto, the part can further include other elements, not excluding the other elements.

It will also be understood the terms "first", "second", etc. may be used herein not to limit elements and/or components but to distinguish one element or component from another element or component.

Embodiments of the disclosure will now be described more fully hereinafter with reference to the accompanying drawings so that they may be easily implemented by those of ordinary skill in the art. However, embodiments of the disclosure may have different forms and should not be construed as being limited to the descriptions set forth herein. In addition, parts not related to the disclosure are omitted to clarify the description of the embodiments of the disclosure, and like reference numerals in the drawings denote like elements throughout.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in more detail with reference to the accompanying drawings.

Figure 2A:
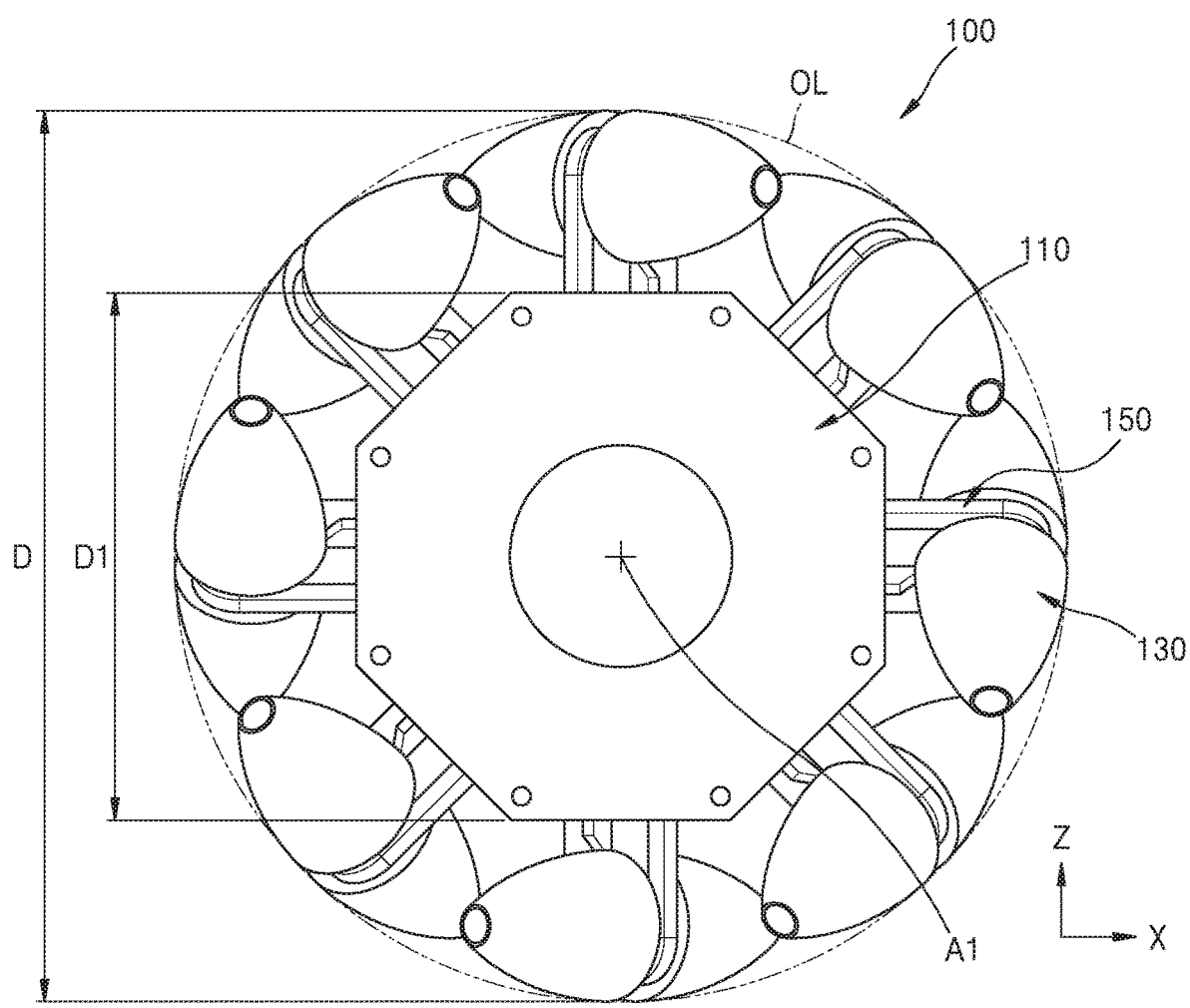
FIG. 2A is a front view of an omni-directional wheel according to an embodiment of the disclosure.

FIG. 1 is a perspective view of an omni-directional wheel 100 according to an embodiment of the disclosure. FIG. 2A is a front view of the omni-directional wheel 100, and FIG. 2B is a plan view of the omni-directional wheel 100.

Figure 2B:
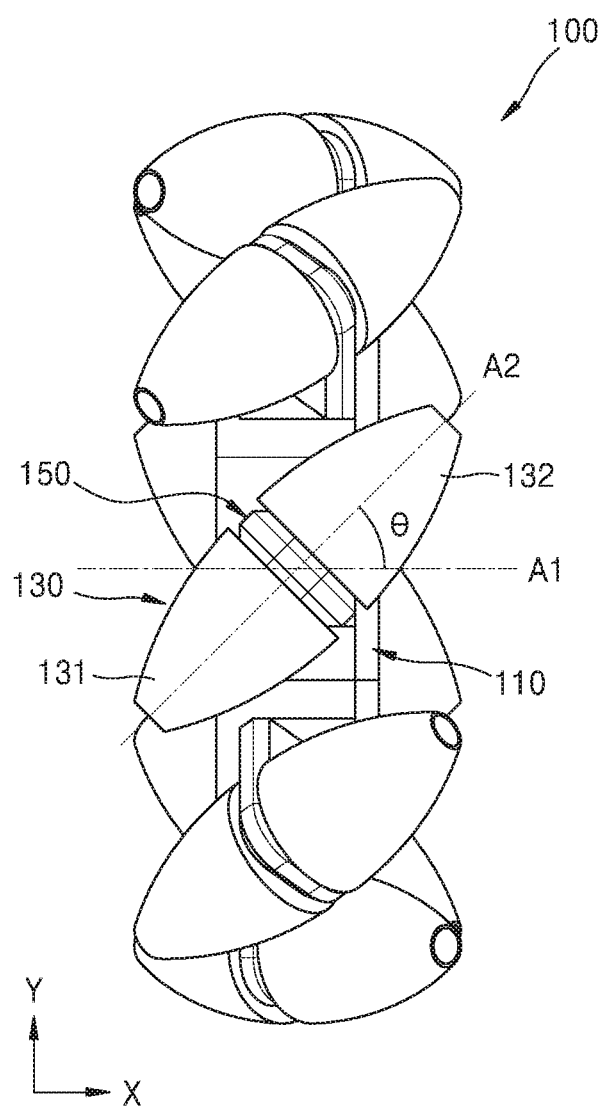
FIG. 2B is respectively a plan view of an omni-directional wheel according to an embodiment of the disclosure.

Referring to FIGS. 1, 2A, and 2B, an omni-directional wheel 100 may include a center wheel 110, a plurality of peripheral wheels 130 arranged around or in other words, along a circumference of the center wheel 110, and a plurality of variable supports 150 respectively supporting the plurality of peripheral wheels 130 with respect to the center wheel 110. That is, each variable support of the plurality of variable supports 150 supports a respective peripheral wheel of the plurality of peripheral wheels 130.

The center wheel 110 may rotate about a first rotation axis A1. The center wheel 110 is rotatable about the first rotation axis A1 such that the omni-directional wheel 100 may move in forward and rearward directions that are perpendicular to the first rotation axis A1.

Because the outer periphery of the center wheel 110 is not in direct contact with the ground (due to the plurality of variable supports 150 and the plurality of peripheral wheels 130), the outer shape of the center wheel 110 is not particularly limited. For example, in the embodiment of FIGS. 1-2B, the center wheel 110 may have an octagonal shape, but the embodiment is not limited thereto. The center wheel 110 may have various other outer shapes, for example, a hexagon shape, a pentagon shape, etc.

Referring to FIGS. 1 and 2A, a diameter D2 (FIG. 1) of a cross-sectional area of each of the plurality of peripheral wheels 130 is less than an overall diameter D (FIG. 2A) of the omni-directional wheel 100. The diameter D2 of the cross-sectional area of each of the plurality of peripheral wheels 130 may be less than a diameter D1 of the center wheel 110.

Each of the plurality of peripheral wheels 130 may rotate about a second rotation axis A2 extending in a different direction than a direction in which the first rotation axis A1 extends. The second axis A2 of each of the plurality of peripheral wheels 130 may form a predetermined angle with respect to the first rotation axis A1. For example, referring to FIG. 2B, an angle θ formed by the second rotation axis A2 of each of the peripheral wheels 130 with respect to the first rotation axis A1 may be greater than 0° but less than or equal to 90°. For example, an angle θ formed by the second rotation axis A2 of each of the plurality of peripheral wheels 130 with respect to the first rotation axis A1 may be in a range between 30° and 60°. In this case, the angle θ formed by the second rotation axis A2 with respect to the first rotation axis A1 may be an angle formed by projecting the first and second rotation axes A1 and A2 onto an arbitrary plane. For example, when the first and second rotation axes A1 and A2 are projected onto an X-Y plane as shown in FIG. 2B (i.e., in a plan view), an angle formed by the projected second rotation axis A2 with respect to the projected first rotation axis A1 may be the angle θ formed by the second rotation axis A2 with respect to the first rotation axis A1.

As each of the plurality of peripheral wheels 130 is rotatable about the second rotation axis A2 different from the first rotation axis A1, when an external force is exerted on the omni-directional wheel 100, the omni-directional wheel 100 may easily move in a different direction than the front and back directions.

The variable supports 150 may respectively support the plurality of peripheral wheels 130 with respect to the center wheel 110.

Each of the plurality of peripheral wheels 130 may include a first sub-wheel 131 positioned on one side of the variable support 150 and a second sub-wheel 132 positioned on the other side thereof. The first and second sub-wheels 131 and 132 are arranged in the direction in which the second rotation axis A2 extends and are connected to each other via a rotating shaft extending through the variable support 150.

Each of the plurality of peripheral wheels 130 may have an overall shape with a swollen center. In other words, each of the plurality of peripheral wheels 130 may have an elliptical shape as its cross-section. For example, each of the first and second sub-wheels 131 and 132 may be constructed such that a diameter of a proximal end region adjacent to the variable support 150 is greater than a diameter of a distal end region provided farther away from the variable support 150. Due to this design construction, a virtual outline (OL; FIG. 2A) of the omni-directional wheel 100 formed by the plurality of peripheral wheels 130 may have an overall circular shape having the diameter D.

The variable support 150 may be positioned in a central portion on each surface of the peripheral wheel 130. The variable support 150 may be provided between the first and second sub-wheels 131 and 132 along the extending direction of the second rotation axis A2. The variable support 150 may rotatably support the rotating shaft extending through the variable support 150.

The variable support 150 may be positioned in a central portion of the peripheral wheel 130 rather than on either side thereof so as to have a predetermined thickness T. For example, the thickness T of the variable support 150 may be greater than or equal to one twentieth (1/20) of a length L of the peripheral wheel 130 along the second rotation axis A2. Furthermore, the thickness T of the variable support 150 may be less than or equal to one half of the length L of the peripheral wheel 130. That is, the following relationship is established: $\frac{1}{20}L \leq T \leq \frac{1}{2}L$.

Accordingly, even when the weight of a moving body (1100 of FIG. 13) supported by one or more omni-directional wheels 100 increases, the omni-directional wheels 100 may provide a predetermined necessary support.

Figure 3:
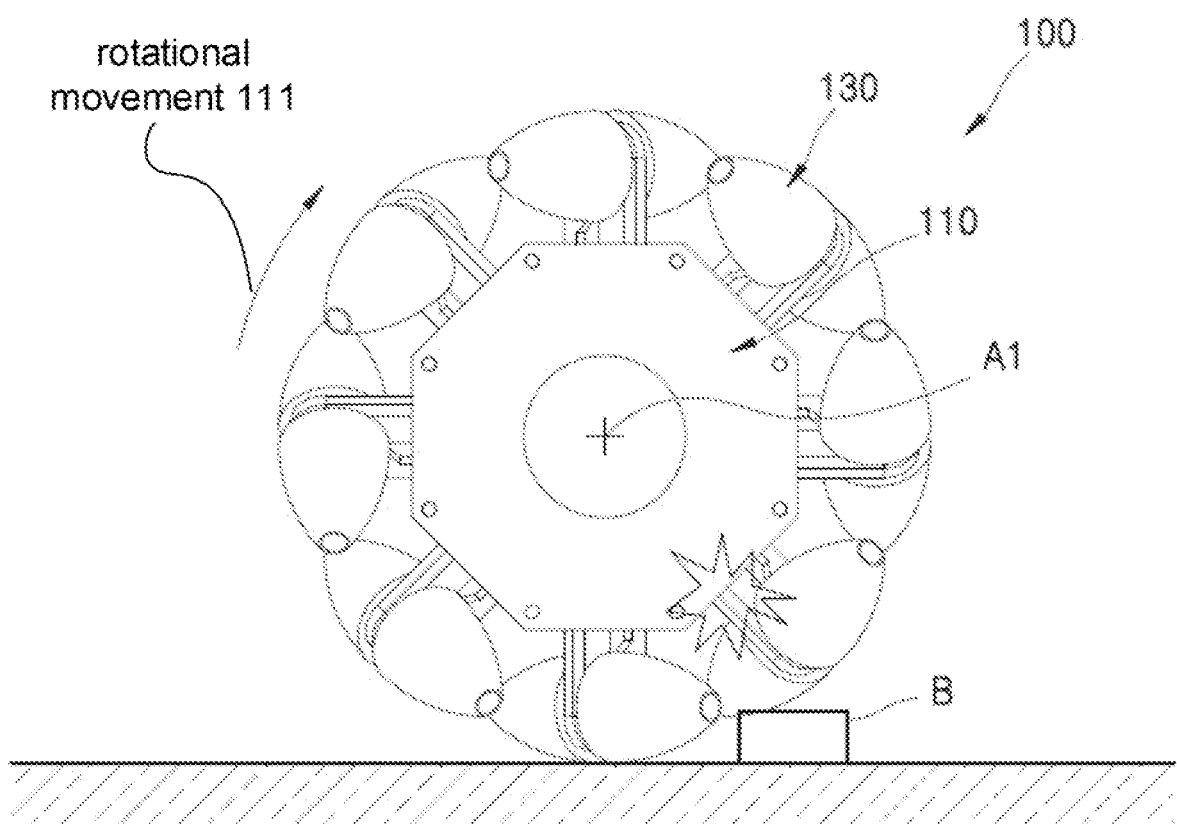
FIG. 3 is a diagram for describing a process during which an omni-directional wheel crosses over an obstacle, according to an embodiment of the disclosure.
Figure 4:
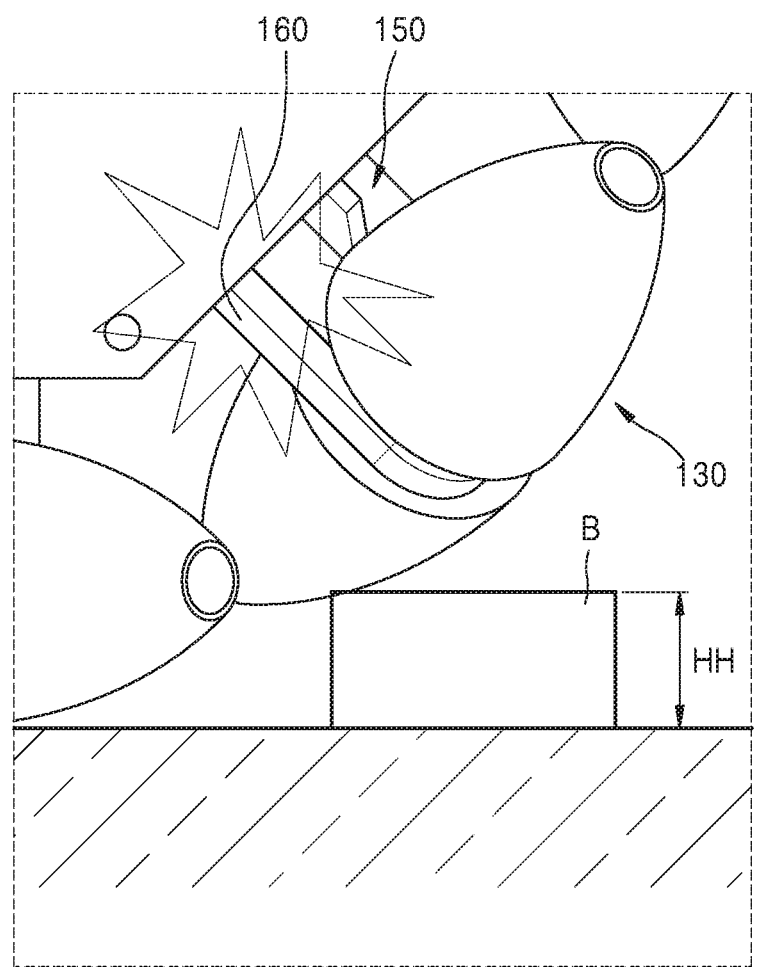
FIG. 4 is an enlarged view of a region of FIG. 3.

FIG. 3 is a diagram for describing a process during which an omni-directional wheel 100 crosses over an obstacle, according to an embodiment of the disclosure, and FIG. 4 is an enlarged view of a region of FIG. 3;

Referring to FIGS. 3 and 4, as the center wheel 110 rotates about a first rotation axis A1, the omni-directional wheel 100 moves forward (or rearward) while rotating about the first rotation axis A1. For example, while performing rotational movement 111 (see FIG. 3), the omni-directional wheel 100 may pass over a small obstacle B protruding above its path (protruding above the ground).

For example, the obstacle B may be a doorstep (i.e., a type of threshold). As another example, the obstacle B may be an electric wire. A height HH at which the obstacle B protrudes may be less than or equal to 20 mm. The height HH may be less than or equal to 10 mm.

While the omni-directional wheel 100 is passing over the obstacle B, at least one of a plurality of peripheral wheels 130 may collide with the obstacle B, and thus, an impact may be applied to the at least one of the peripheral wheels 130.

A common wheel without the peripheral wheels 130 is larger than the obstacle B, and thus it may absorb an impact from passing over the obstacle B with only a small elastic deformation.

However, the omni-directional wheel 100 including the peripheral wheels 130 is significantly larger than the obstacle B, but each of the peripheral wheels 130 may be of a similar size to the obstacle B or slightly larger than that the obstacle B. Thus, it may be difficult to sufficiently absorb an impact force applied to the peripheral wheel 130 during passing over the obstacle B with only an elastic deformation of the peripheral wheel 130. Accordingly, the impact may be transmitted to the variable supports 150 supporting the at least one of the plurality of peripheral wheels 130 in a one-to-one ratio, which may deteriorate the durability of the omni-directional wheel 100.

The omni-directional wheel 100 according to an embodiment of the disclosure may provide a structure for preventing deterioration of the durability of the omni-directional wheel 100 even when an impact force is applied to the plurality of variable supports 150 via the at least one of the plurality of peripheral wheels 130.

Figure 5A:
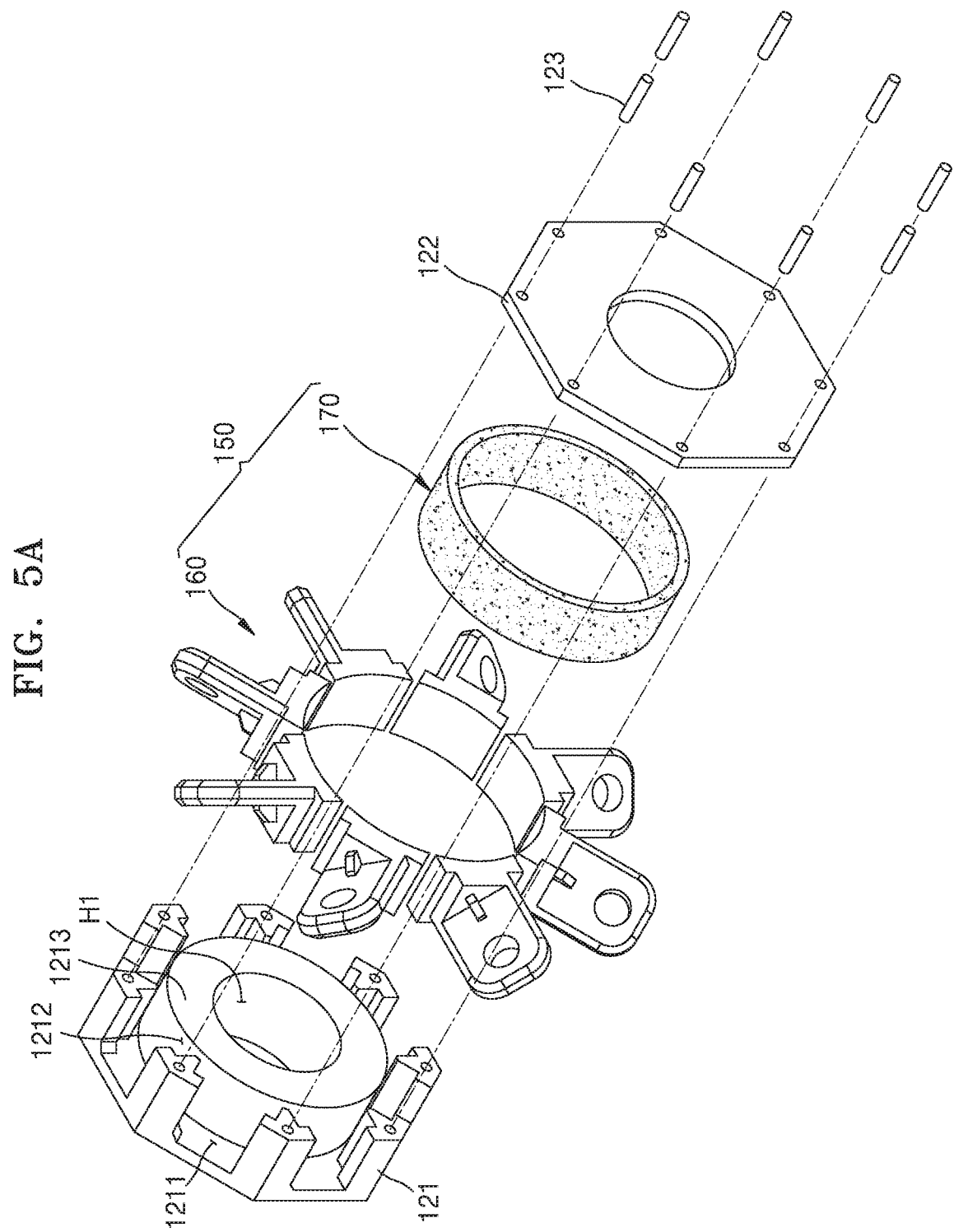
FIG. 5A is exploded perspective view of an omni-directional wheel according to an embodiment of the disclosure.
Figure 5B:
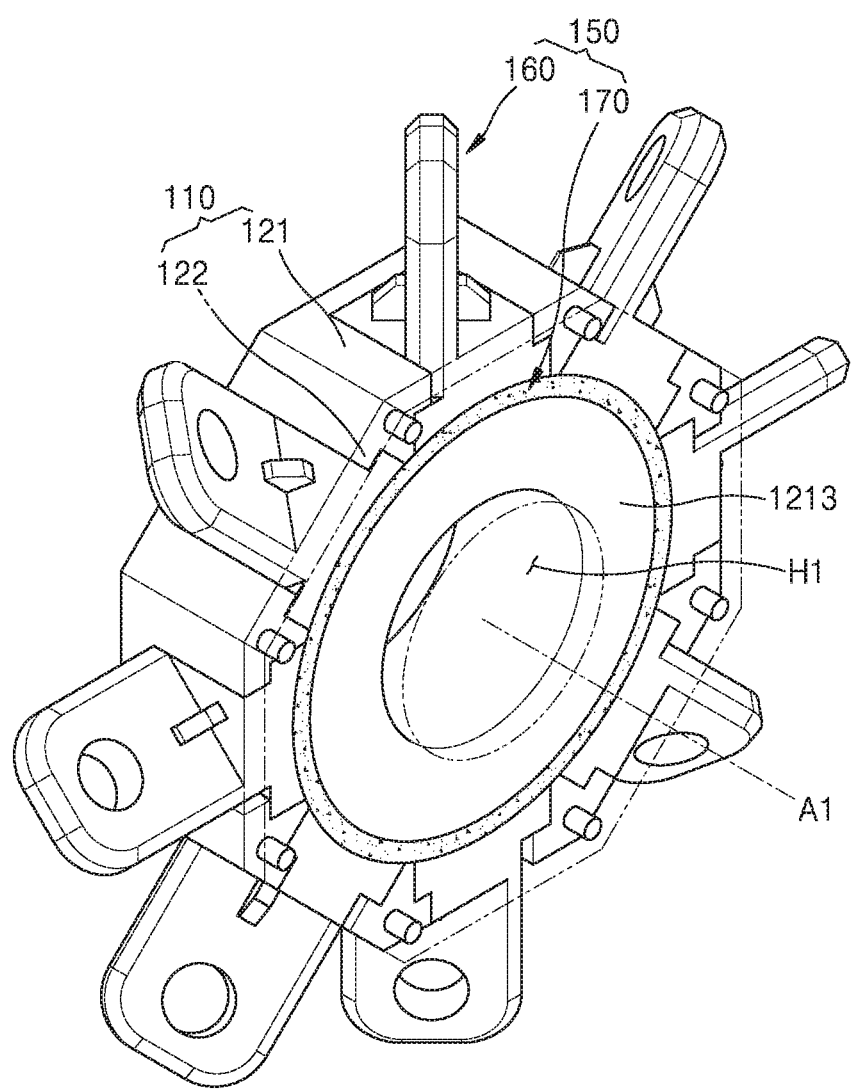
FIG. 5B is assembled perspective views of an omni-directional wheel according to an embodiment of the disclosure.
Figure 6:
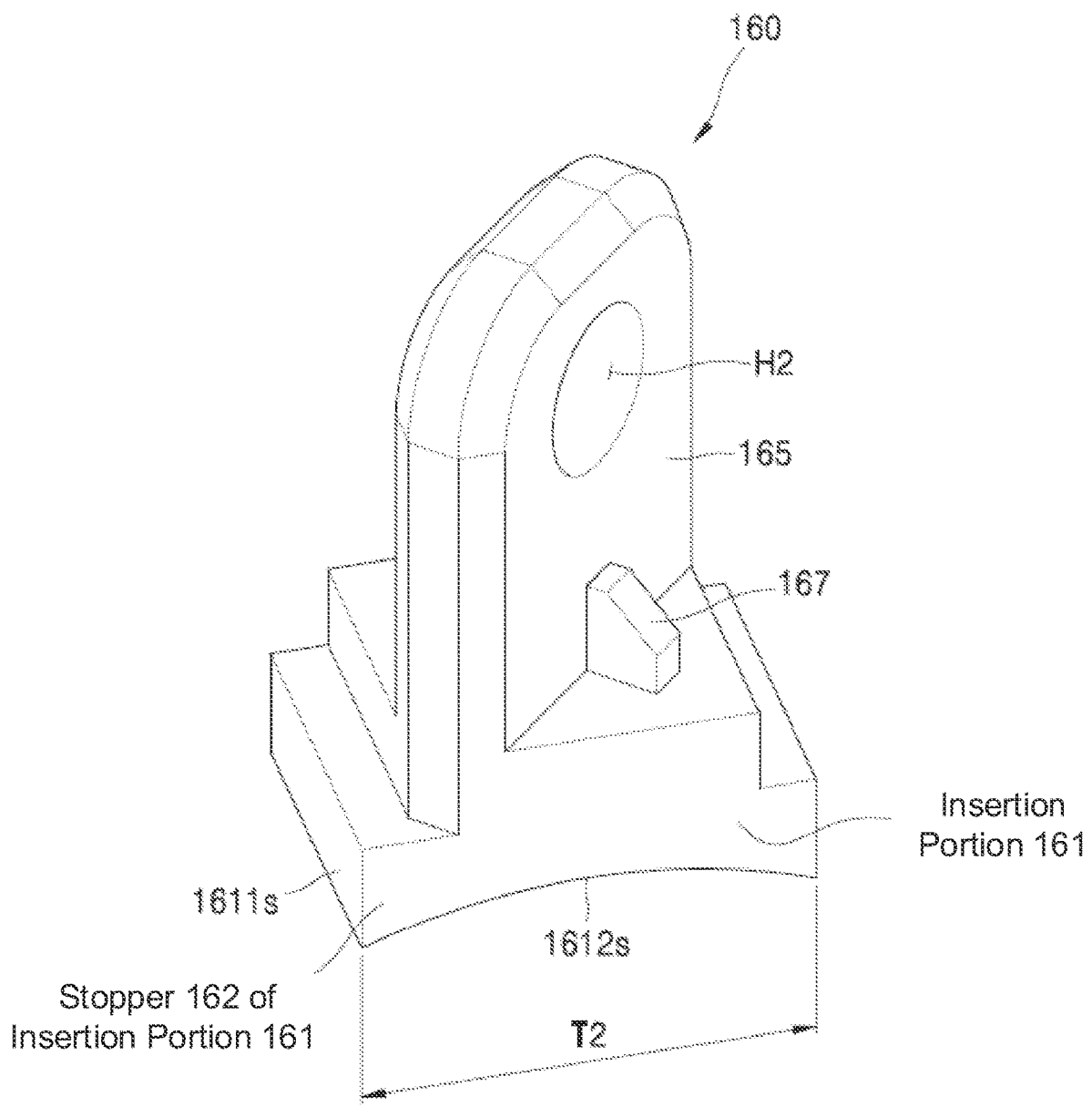
FIG. 6 is a perspective view of a support member according to an embodiment of the disclosure.
Figure 7:
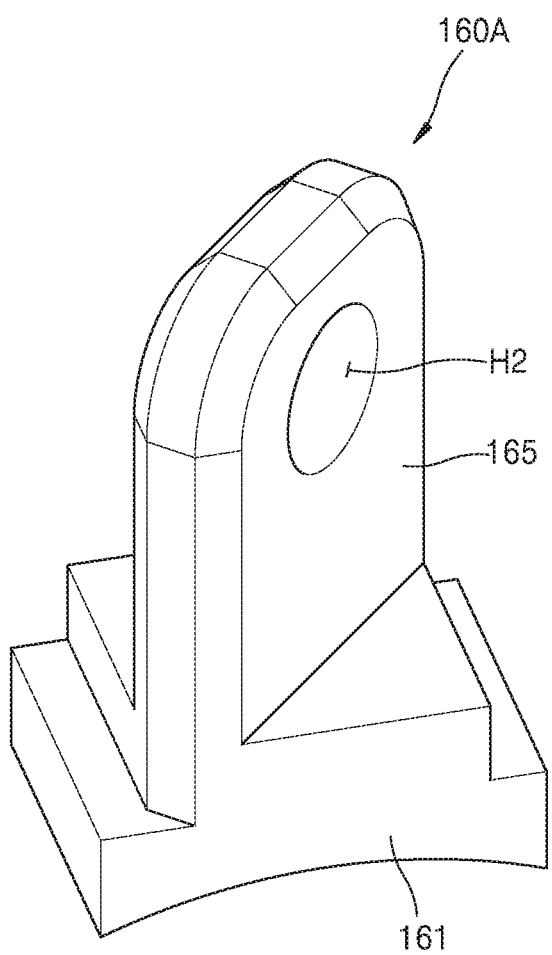
FIG. 7 is a perspective view of a support member according to another embodiment of the disclosure.
Figure 8:
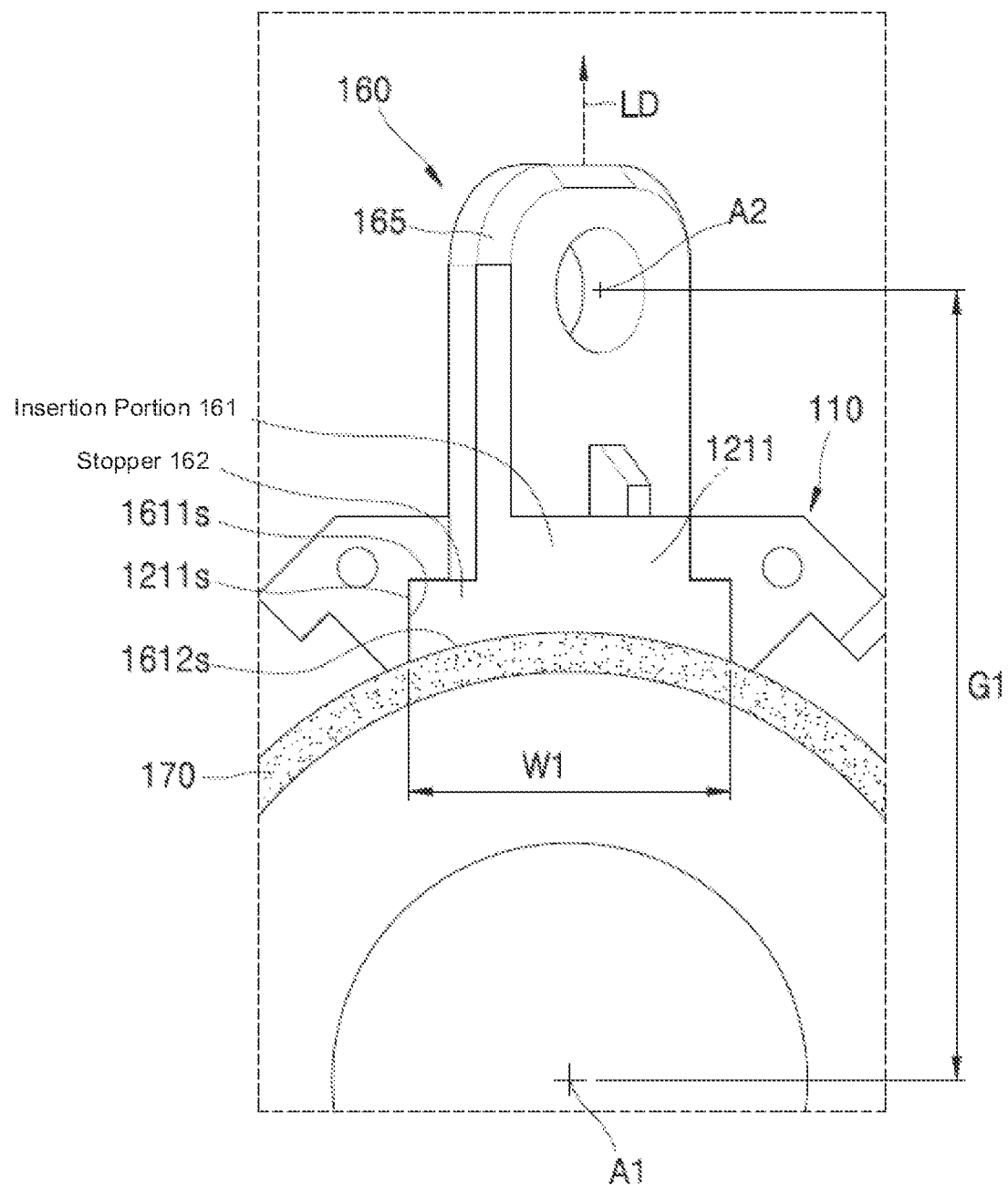
FIG. 8 illustrates a variable support according to an embodiment of the disclosure.
Figure 9:
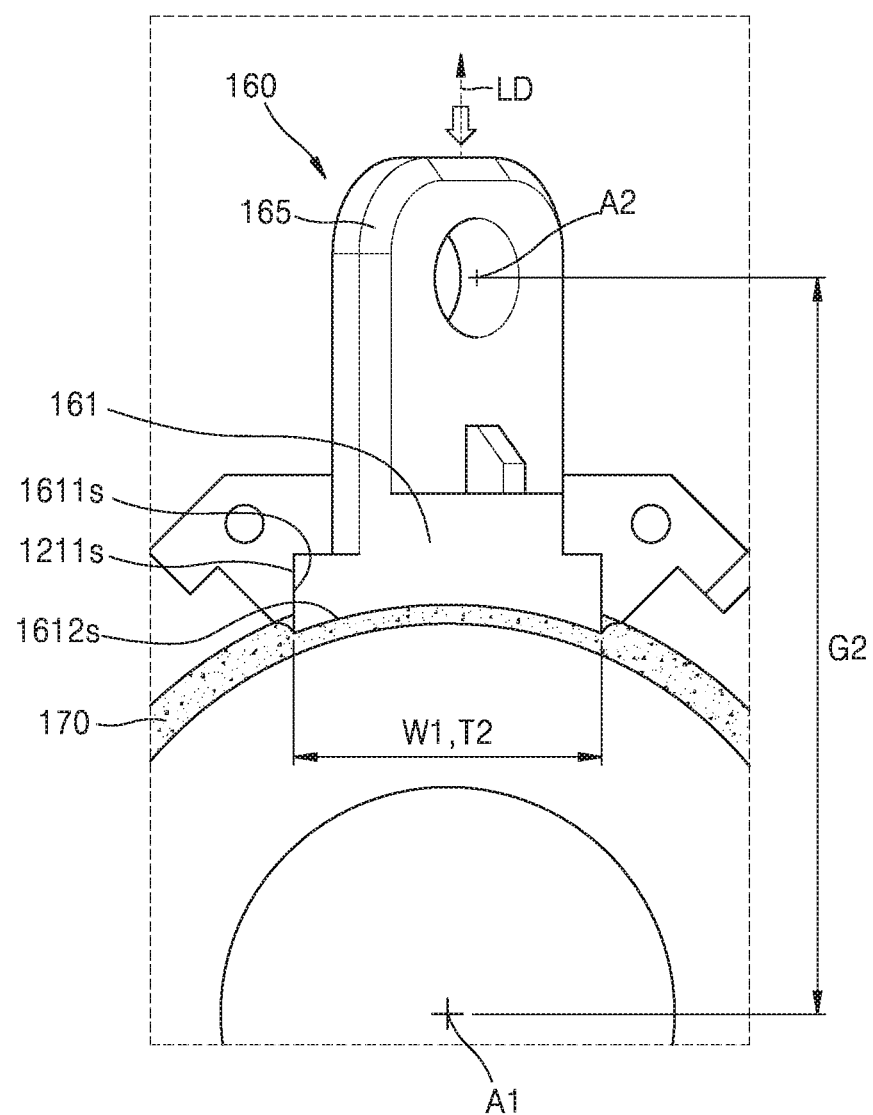
FIG. 9 is a diagram for explaining a state of the variable support of FIG. 8 when an impact is applied thereto.
Figure 10:
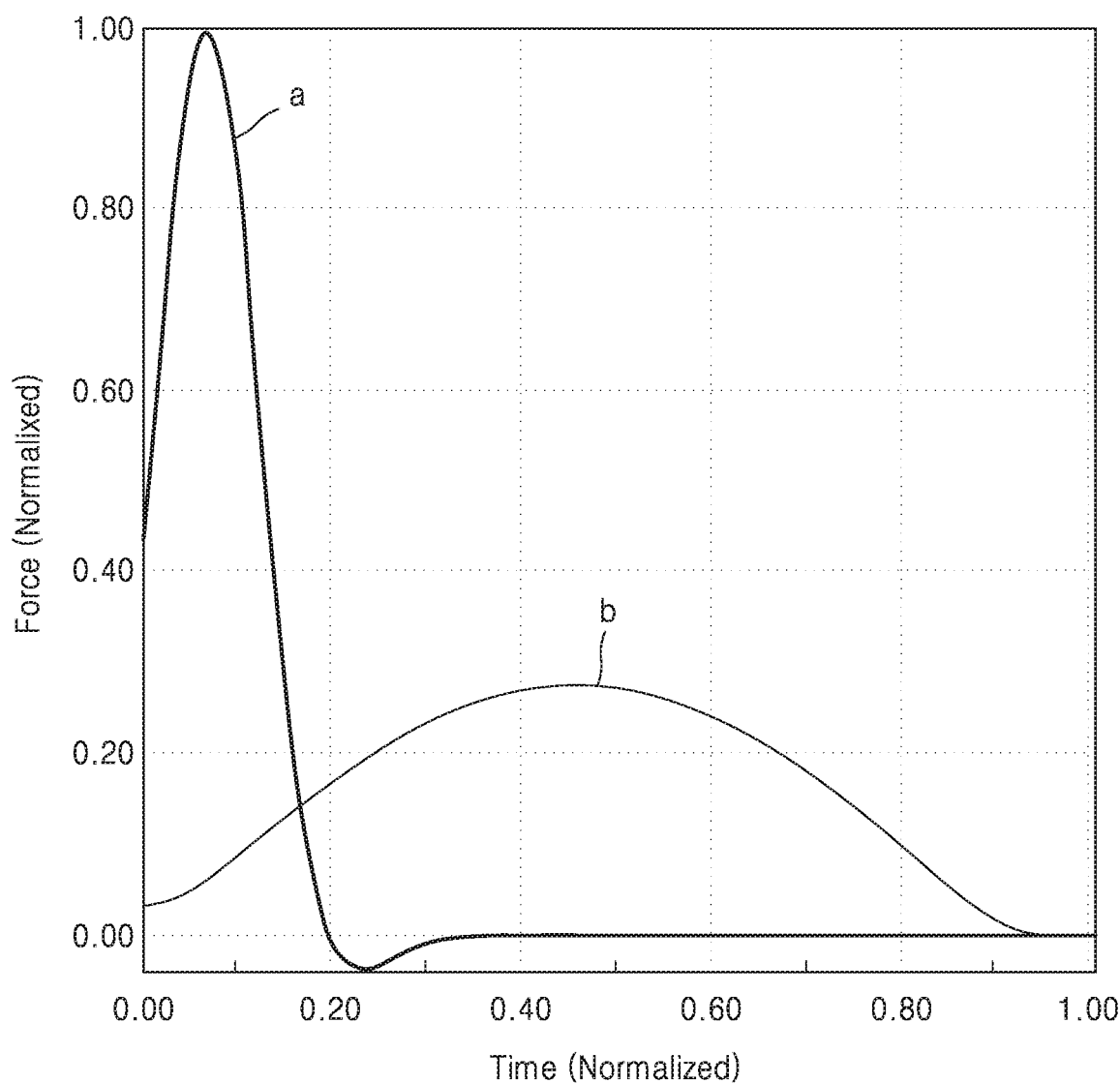
FIG. 10 is a graph illustrating a maximum force instantaneously exerted and the time during which an impact is absorbed when the same impact is applied to an omni-directional wheel according to a comparative example and an omni-directional wheel according to an embodiment of the disclosure.

FIG. 5A is an exploded perspective view of an omni-directional wheel 100 according to an embodiment of the disclosure, and FIG. 5B is an assembled perspective view of an omni-directional wheel 100 according to an embodiment of the disclosure. FIG. 6 is a perspective view of a support member (or a support frame) 160 of a variable support 150 according to an embodiment of the disclosure. FIG. 7 is a perspective view of a support member 160 of a variable support 150 according to another embodiment of the disclosure. FIG. 8 illustrates a variable support 150 including a support member 160 and an elastic member (or an elastic part) 170 according to an embodiment of the disclosure, and FIG. 9 is a diagram for explaining a state of a variable support 150 when an impact force (a downward arrow in the figure) is applied thereto. FIG. 10 is a graph showing a maximum force instantaneously exerted and the time during which an impact force is absorbed when the same impact is applied to an omni-directional wheel according to a comparative example of the related art and the omni-directional wheel 100 according to an embodiment of the disclosure. For convenience, the peripheral wheels 130 are not shown in FIGS. 5A and 5B.

Referring to FIGS. 5A, 5B, and 6, a plurality of variable supports 150 may include a plurality of support members 160 for supporting the plurality of peripheral wheels 130 for rotation and an elastic member 170 for providing an elastic force to the plurality of support members 160.

Referring to FIG. 5A, the center wheel 110 includes a first body 121 and a second body 122 attached to the first body 121. The first body 121 may be affixed to the second body 122 by a plurality of fixing members 123.

The first body 121 may include a plurality of first grooves 1211, and each of the plurality of first grooves 1211 receives (or supports) a portion of the support member 160.

At least a portion of each of the plurality of support members 160 may extend in a direction away from a first rotation axis A1 of a center wheel 110. That is, at least a portion of the support member 160 may extend in a radial direction of the omni-directional wheel 100.

The support member 160 includes an insertion portion 161 inserted into the first groove 1211 of the center wheel 110 and a protrusion portion 165 extending from the insertion portion 161 in a direction away from the first rotation axis A1 of the center wheel 110 and protruding outward with respect to the center wheel 110.

The protrusion portion 165 of the support member 160 includes an insertion hole H2 for a rotating shaft of the peripheral wheel 130 to be inserted therein.

A thickness T (FIG. 1) of the protrusion portion 165 measured along the second rotation axis A2 is less than a thickness T2 (FIG. 6) of the insertion portion 161 measured along a circumferential direction of the center wheel 110.

The support member 160 may be formed of a different material than the center wheel 110. The support member 160 may be designed to have a strength greater than that of the center wheel 110 by taking into account that a spontaneous impact force may be applied on the support member 160 supporting the peripheral wheel 130 while the omni-directional wheel 100 is operated. For example, the support member 160 may be formed of steel, and the first and second bodies 121 and 122 of the center wheel 110 may be formed of aluminum (Al). In this way, by selecting materials of the support members 160 and the center wheel 110 differently, the omni-directional wheel 100 may be designed to be lightweight and satisfy a predetermined strength for coping with the spontaneous impact force.

The plurality of support members 160 may be configured to be individually insertable into the first grooves 1211 of the first body 121. For example, the plurality of support members 160 may be respectively separate components. Thus, when any one of the support members 160 is damaged, only the damaged support member 160 may be selectively replaced.

The support member 160 may further include a stopper 162. The stopper 162 may prevent the support member 160 from separating from the first groove 1211 by protruding in a circumferential direction of the center wheel 100 from the insertion portion 161. That is, the stopper 162 may be a portion of the insertion portion 161 protruding in the circumferential direction of the center wheel 110.

The support member 160 may further include a rib 167 located on a side surface of the protrusion portion 165 and a top surface of the insertion portion 161 as shown in FIG. 6. The rib 167 may project parallel to the second rotation axis A2 from the protrusion portion 165 and may project in a radial direction of the center wheel 110 from the insertion portion 161. The addition of the rib 167 may enhance the strength of the support member 160. However, referring to FIG. 7, a support member 160A of another embodiment may not necessarily include the rib 167, and the rib 167 of FIG. 6 may be selectively removed from the support member 160 as needed.

Referring back to FIG. 5A, the elastic member 170 may provide an elastic force to the plurality of support members 160 in a direction away from the first rotation axis A1 of the center wheel 110 (i.e., in a radial direction away from the first rotation axis A1). The elastic member 170 may support the support member 160 to be movable in a direction towards the first rotation axis A1 of the center wheel 110.

Referring to FIGS. 3 and 4, when an impact (or an impact force) is applied to at least one of the peripheral wheels 130 as the omni-directional wheel 100 moves via rotation on the ground, the applied impact is then transmitted to the corresponding support members 160 supporting the peripheral wheel 130. Referring to FIGS. 8 and 9, when an impact applied to the peripheral wheel 130 is transmitted to a support member 160 supporting the peripheral wheel 130, the support member 160 moves in the direction toward the first rotation axis A1 of the center wheel 110 (i.e., in a radial direction toward the first rotation axis A1), and a distance between the peripheral wheel 130 to which the impact is applied and the center wheel 110 changes from G1 (FIG. 8) to G2 (FIG. 9). During this event, the elastic member 170 absorbs the impact transmitted to the support member 160 through an elastic deformation. As the elastic member 170 absorbs the impact, the time during which the impact is absorbed may be increased, and thus, a force instantaneously exerted due to the impact may be lowered.

Otherwise, when the omni-directional wheel 100 does not include the variable support 150 including a plurality of support members 160 and an elastic member 170 and the peripheral wheel 130 is supported with respect to the center wheel 110 by a supporting structure in which the distance between the peripheral wheel 130 and the center wheel 110 remains unchanged during impact, the impact applied to the peripheral wheel 130 may be transmitted to the supporting structure without being mitigated. Thus, as seen on a graph a of FIG. 10, a very large impact is instantaneously applied to a supporting structure located between the peripheral wheel 130 and the center wheel 110, and it takes a very short time to absorb the impact. This may cause considerable damage to the omni-directional wheel 100.

On the other hand, when an impact is transmitted to the omni-directional wheel 100 according to an embodiment of the disclosure, due to movement of the support member 160 and an elastic deformation of the elastic member 170, as seen on a graph b of FIG. 10, a maximum force instantaneously applied to the support member 160 is reduced, and the time during which the impact is absorbed is increased, as compared to the omni-directional wheel 100 according to a comparative example. The maximum force instantaneously applied to the variable support 150 according to an embodiment of the disclosure may be reduced to less than or equal to about one third of a maximum force instantaneously applied to the supporting structure according to the comparative example. The time during which the impact is absorbed according to the embodiment of the disclosure may be increased to be greater than or equal to double the time during which the impact applied to the supporting structure is absorbed according to the comparative example.

As described above, the omni-directional wheel 100 according to an embodiment of the disclosure is provided with the variable supports 150 to reduce the magnitude of an impact instantaneously applied thereto and increase the time during which the impact is absorbed by the variable supports 150. Due to this configuration, the omni-directional wheel 100 according to an embodiment of the disclosure may stably absorb an external impact.

Furthermore, the omni-directional wheel 100 is provided with the variable supports 150 to absorb impacts, thereby permitting flexibility in selecting a wide range of materials of the peripheral wheels 130. For example, the peripheral wheels 130 may be formed of an elastically deformable material as well as materials exhibiting little or no elastic deformation.

Figure 11A:
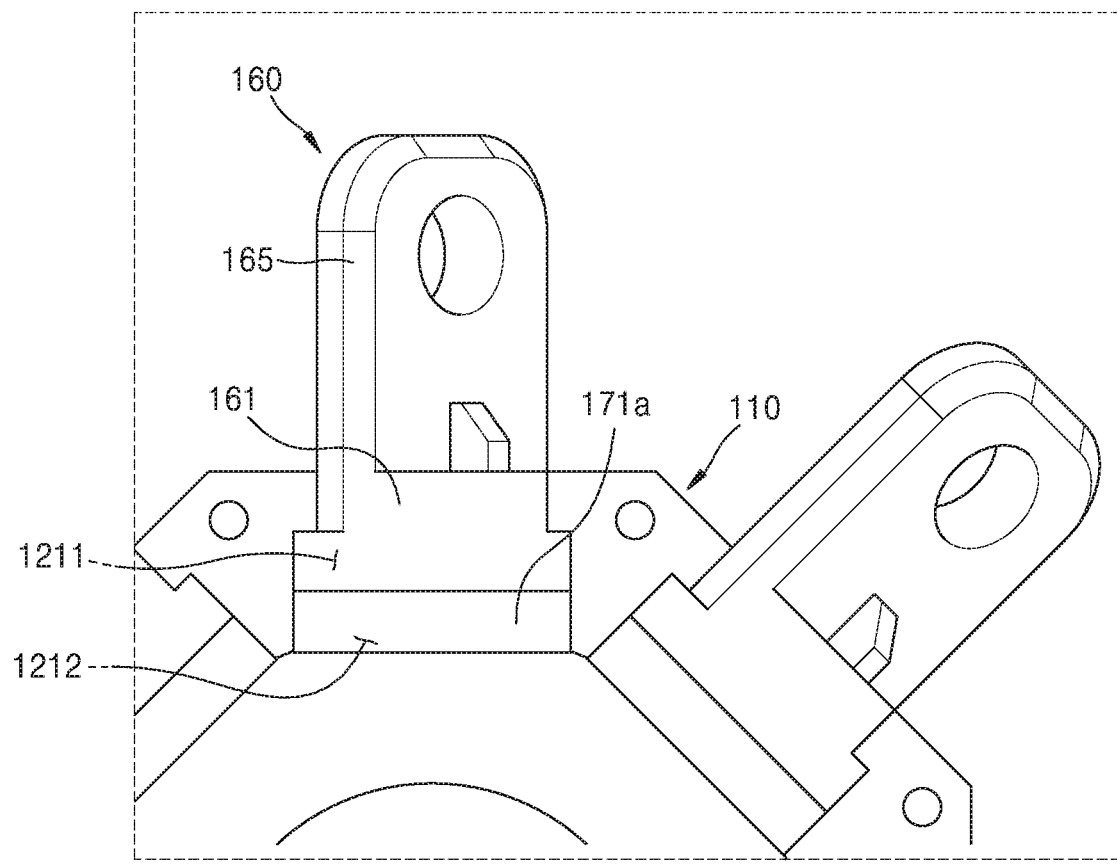
FIG. 11A is diagram for explaining an omni-directional wheel according to other embodiment of the disclosure.
Figure 11B:
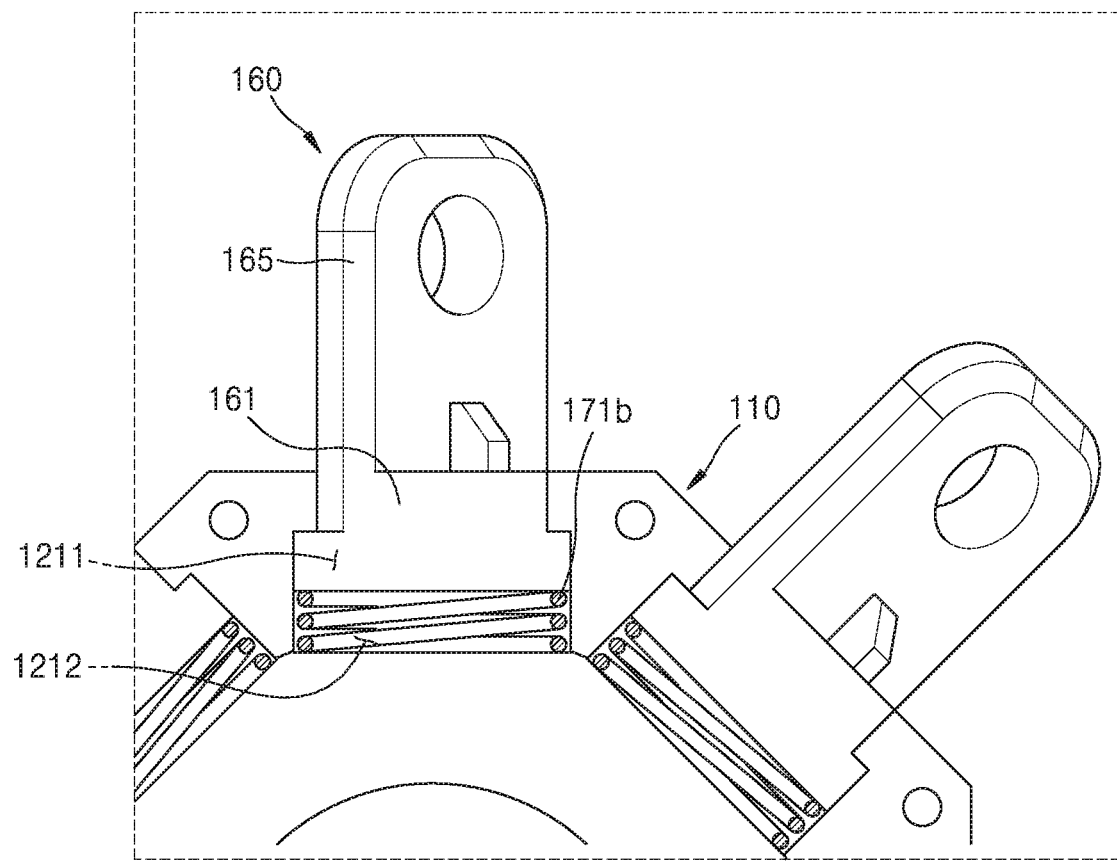
FIG. 11B is diagram for explaining an omni-directional wheel according to other embodiment of the disclosure.

Referring back to FIGS. 8 and 9, the elastic member 170 may be formed of a material providing an elastic force. For example, the elastic member 170 may be a pad made of rubber. Polyurethane may be used as an example of the rubber. However, the material of the elastic member 170 is not limited thereto, and may be formed of various other materials capable of providing an elastic force to reduce the impact force. For example, as shown in FIG. 11A, an elastic member 171a may be composed of a fluid instead of rubber to provide an elastic force due to a fluid pressure and accordingly, absorb an impact. In this case, the fluid may be air, and a separate packing (not shown) may be provided in the center wheel 110 to prevent escape of the fluid. As another example, as shown in FIG. 11B, an elastic member 171b may be a spring that provides another type of elastic force (e.g., a spring force).

When the elastic member 170 is made of rubber, it is easy to achieve the durability of the elastic member 170. The rubber is significantly stronger under compressive stress than under tensile stress. By positioning the elastic member 170 made of rubber such that it may undergo a compressive stress in the process of absorbing an impact, the elastic member 170 may maintain sufficient durability.

For example, the elastic member 170 may be positioned to contact an end portion of the support member 160 facing the first rotation axis A1 of the center wheel 110. When an impact is transmitted to the support member 160 via the corresponding peripheral wheel 130, the support member 160 may move in a direction towards the first rotation axis A1 of the center wheel 110. During this movement of the support member 160, the elastic member 170 is compressively deformed to absorb the impact transmitted to the support member 160.

The support member 160 may move in a specific direction due to the first groove 1211. For example, referring to FIGS. 6, 8 and 9, a side surface 1611s of the insertion portion 161 of the support member 160 and a surface 1211s of the first groove 1211 opposite to the side surface 1611s may be parallel to a direction LD in which the protrusion portion 165 extends. A width W1 of the first groove 1211 may correspond to the thickness T2 of the insertion portion 161. Due to this configuration, when the impact is transmitted to the support member 160, the support member 160 may move in a direction parallel to the direction LD in which the protrusion portion 165 extends. Furthermore, by preventing the support member 160 from swaying in other directions (e.g., an axial direction of the center wheel 110 and a circumferential direction of the center wheel 110, it is possible to achieve smooth rotation of the omni-directional wheel 100.

Figure 12:
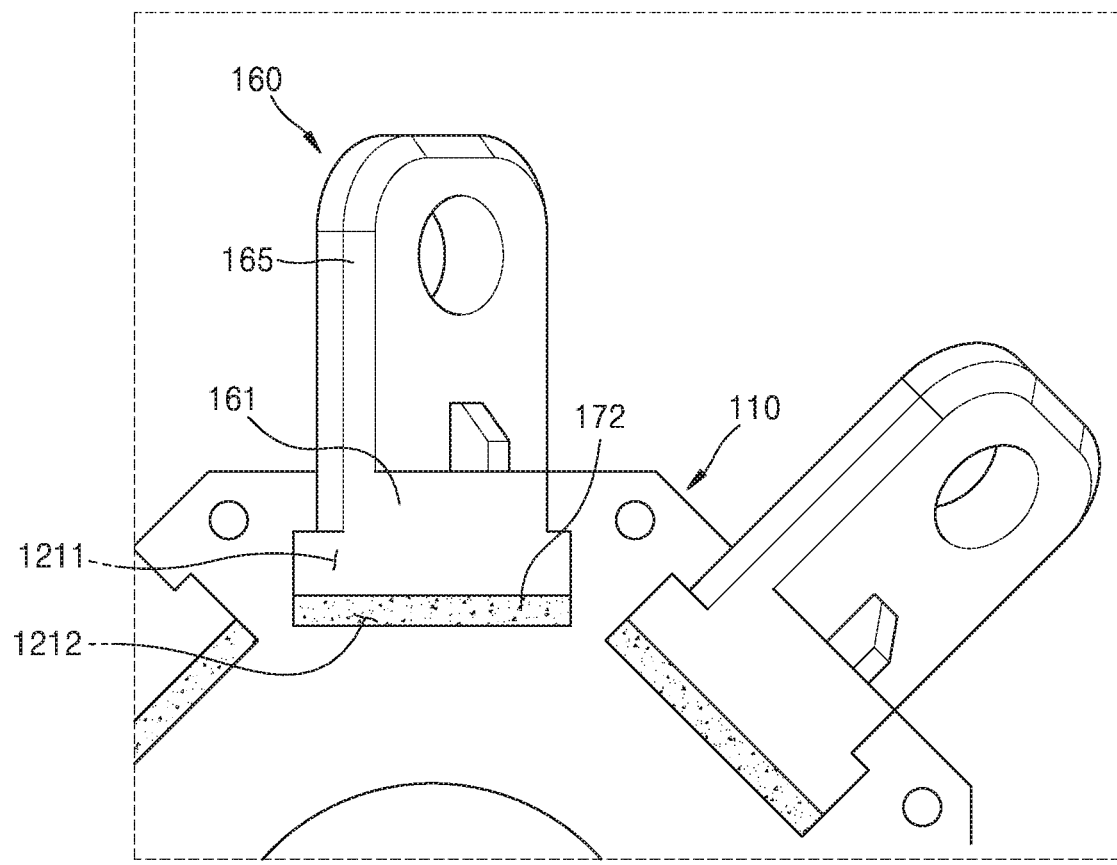
FIG. 12 is diagram for explaining an omni-directional wheel according to other embodiment of the disclosure.

Referring back to FIGS. 5A, 5B, and 6, the elastic member 170 may include a single body that provides an elastic force to the plurality of support members 160. For example, the elastic member 170 may have a ring shape. However, the elastic member 170 is not limited thereto, and may have various other shapes. For example, as shown in FIG. 12, elastic members 172 may be a plurality of bodies that respectively provide an elastic force to the support members 160.

A surface 1612s of the insertion portion 161 of the support member 160, which faces the elastic member 170, may have a shape corresponding to that of the elastic member 170. For example, when the elastic member 180 has a ring shape as shown in FIG. 8, the surface 1612s of the insertion portion 161 facing the elastic member 170 may be curved corresponding to the curvature of the elastic member 170.

The center wheel 110 may include a second groove 1212 in which the elastic member 170 is positioned. The second groove 1212 may have a shape corresponding to that of the elastic member 170. The second groove 1212 may continuously extend to the first grooves 1211. That is, the second groove 1212 and the first groove 1211 may be connected.

The first body 121 may include an insertion hole H1 for receiving a rotating shaft which is rotatable about the first rotation axis A1 and a support frame 1213 that is located near the insertion hole H1 and supports an inner surface of the elastic member 170.

Figure 13:
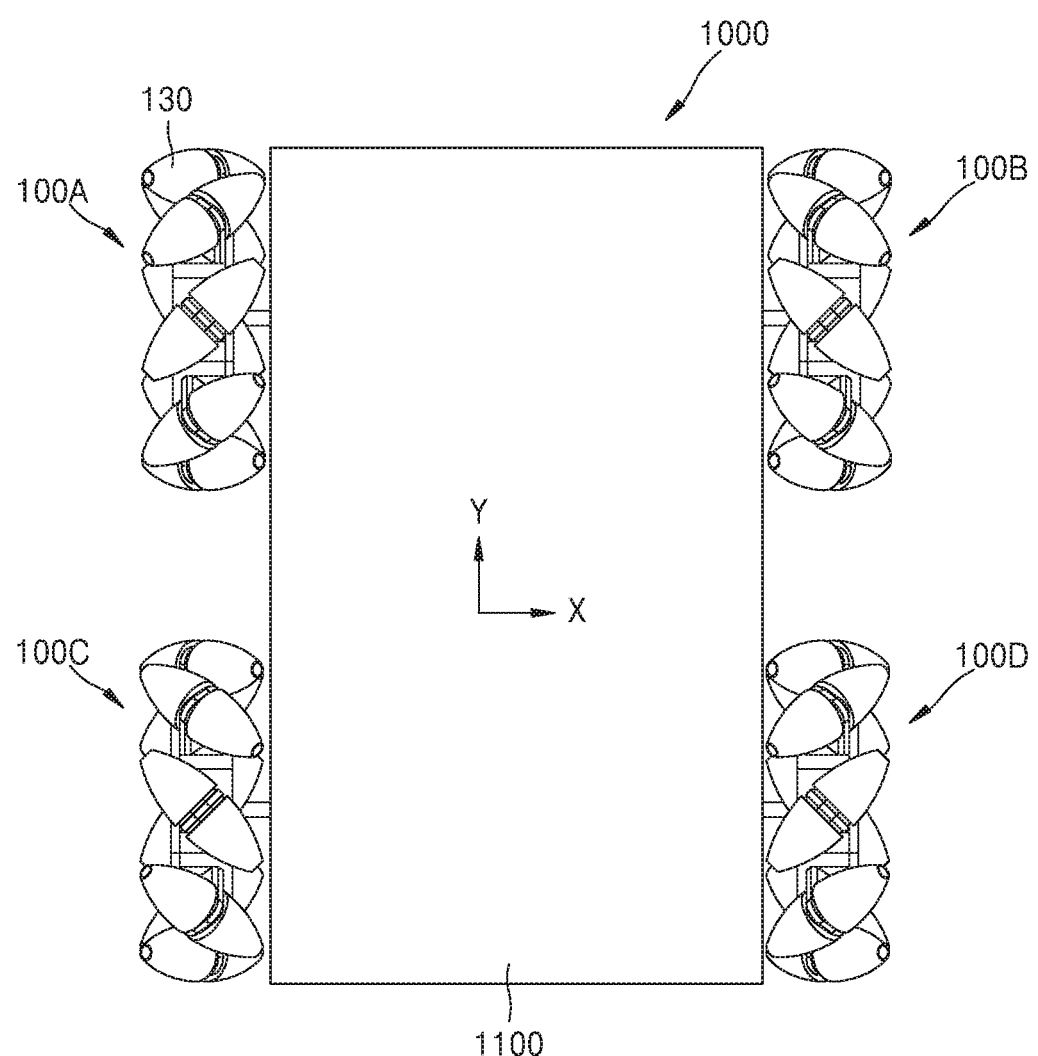
FIG. 13 illustrates a moving device according to an embodiment of the disclosure.

FIG. 13 illustrates a moving device 1000 including a plurality of omni-directional wheels 100A, 100B, 100C, and 100D according to an embodiment of the disclosure. Referring to FIG. 13, the moving device 1000 may include a moving body 1100 and the plurality of omni-directional wheels 100A, 1008, 100C, and 100D arranged around a periphery of the moving body 1100. Each of the omni-directional wheels 100A, 1008, 100C, and 100D may correspond to the omni-directional wheel 100 according to the above-described embodiment of the disclosure.

The moving body 1100 may include various devices. For example, the moving body 1100 may include a medical imaging apparatus. The medical imaging apparatus may be a magnetic resonance imaging (MRI) apparatus, a computed tomography (CT) apparatus, an ultrasound imaging apparatus, or an X-ray apparatus.

The moving body 1100 may have a predetermined weight. The weight of the moving body 1100 may be, for example, 1000 kg or greater.

The omni-directional wheels 100A, 100B, 100C, and 100D may be arranged symmetrically relative to each other around the moving body 1100. For example, the omni-directional wheels 100B and 100D on the right side of the moving body 1100 may be located symmetrically with respect to the omni-directional wheels 100A and 100C on the left side thereof, respectively. The peripheral wheels 130 of the omni-directional wheels 100B and 100D on the right side of the moving body 1100 may be respectively arranged in opposite directions to those of the omni-directional wheels 100A and 100C on the left side thereof. The omni-directional wheels 100A and 100B at the front of the moving body 1100 may be located symmetrically with respect to the omni-directional wheels 100C and 100D at the rear thereof, respectively. The peripheral wheels 130 of the omni-directional wheels 100A and 1008 at the front may be respectively arranged in opposite directions to those of the omni-directional wheels 100C and 100D at the rear.

Figure 14A:
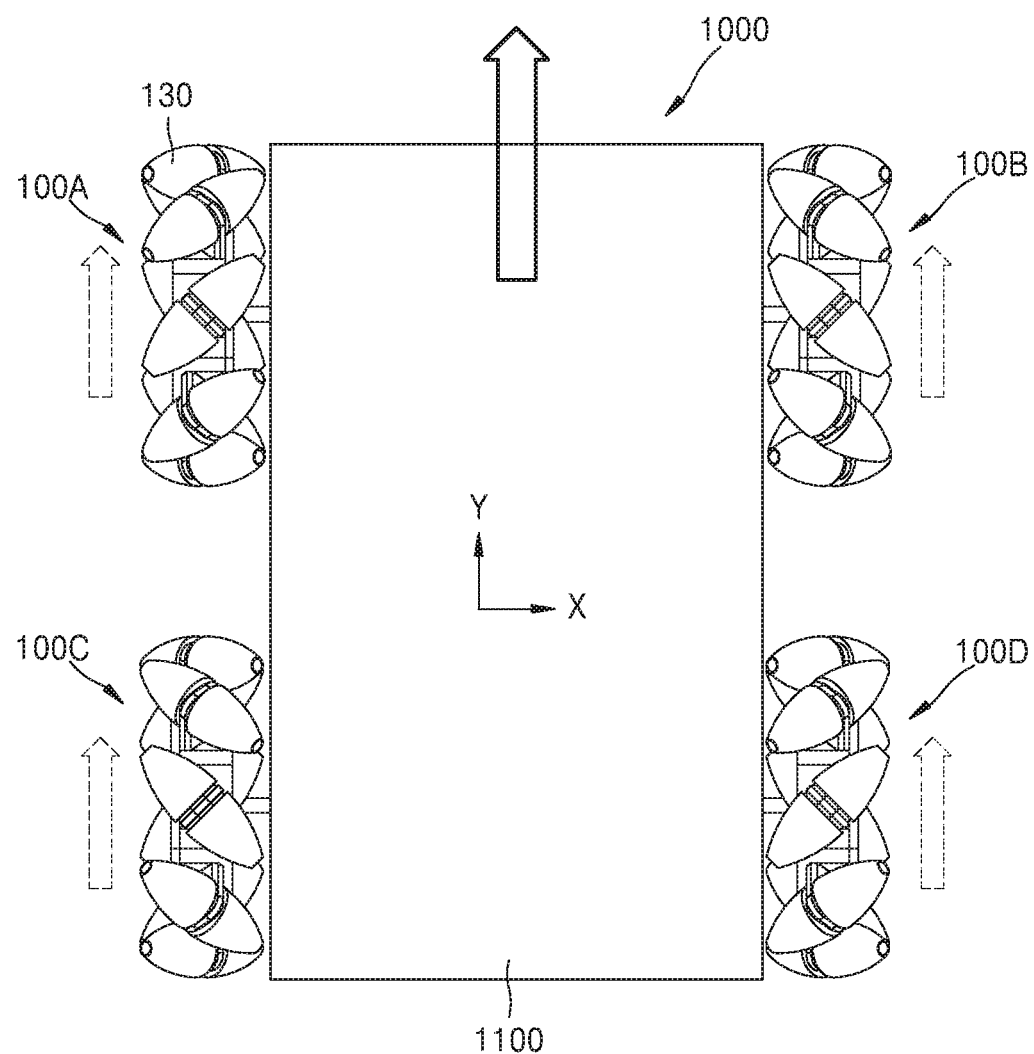
FIG. 14A is diagram for explaining operation of the moving device of FIG. 13.
Figure 14B:
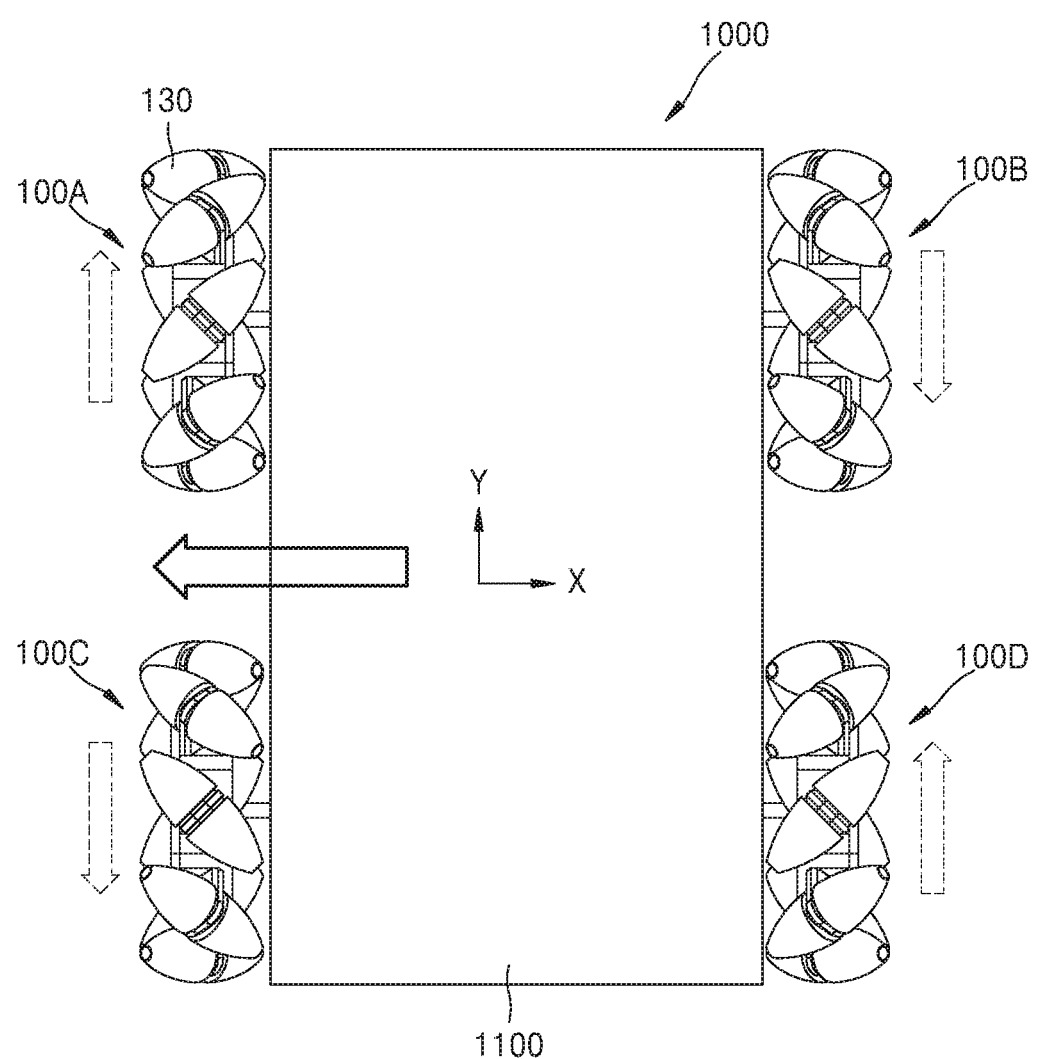
FIG. 14B is diagram for explaining operation of the moving device of FIG. 13.
Figure 14C:
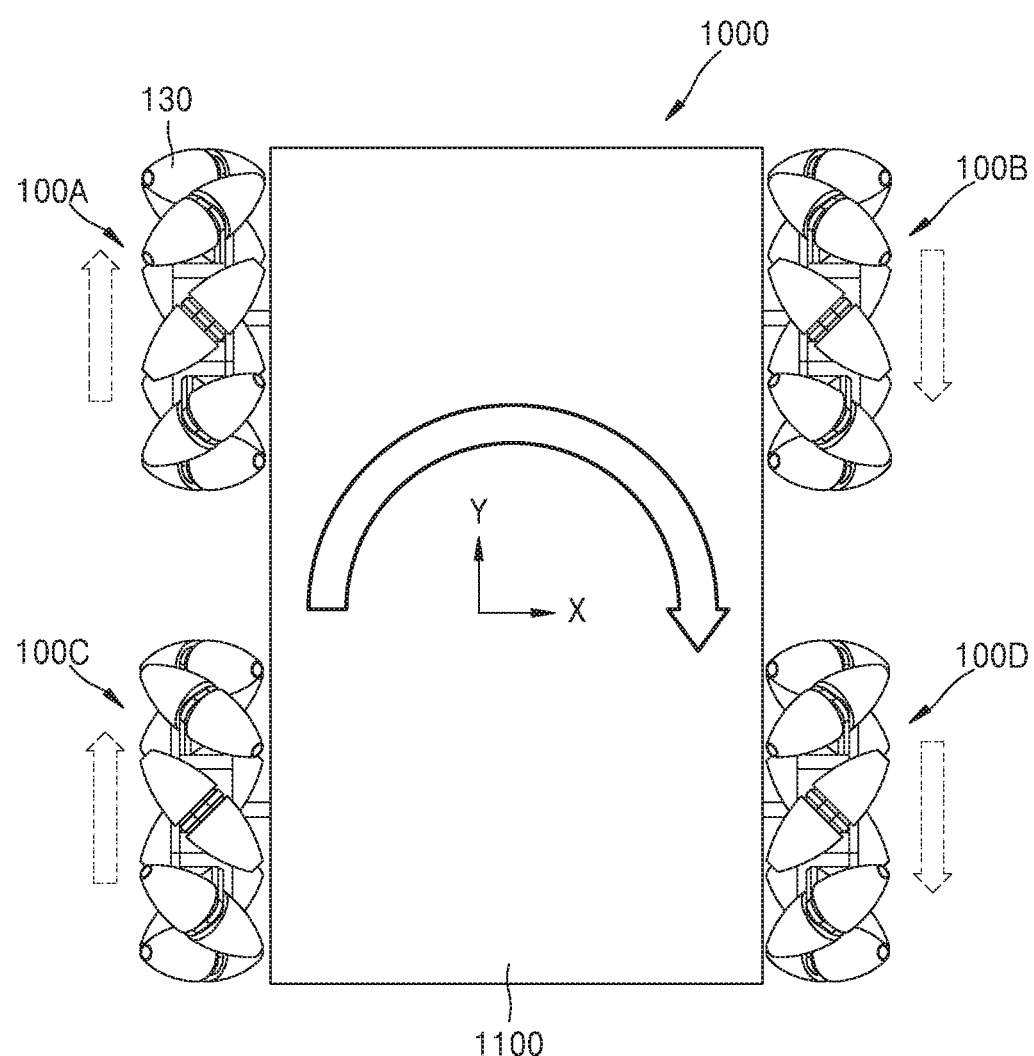
FIG. 14C is diagram for explaining operation of the moving device of FIG. 13.

The moving device 1000 may move in various directions according to the rotational directions of the omni-directional wheels 100A, 100B, 100C, and 100D. For example, as shown in FIG. 14A, when the omni-directional wheels 100A, 100B, 100C, and 100D all rotate in the same directions, the moving body 1100 may move forward or backward. Referring to FIG. 14B, when the omni-directional wheels 100A and 100B or 100C and 100D on the left and right sides of the moving body 1100 respectively rotate in different directions and when the omni-directional wheels 100A and 100C or 100B and 100D located at the front and rear of the moving body 1100 but on the same left or right side thereof rotate in different directions, the moving body 1100 may move in the left or right direction. As shown in FIG. 14C, when the omni-directional wheels 100A and 100B or 100C and 100D on the left and right sides of the moving body 1100 respectively rotate in different directions and when the omni-directional wheels 100A and 100C or 100B and 100D located at the front and rear of the moving body 1100 but on the same left or right side thereof rotate in the same direction, the moving body 1100 may perform yawing motion by rotating clockwise or counter-clockwise.

Although the embodiment of the disclosure is mainly described with respect to an example in which the number of omni-directional wheels 100A, 100B, 100C, and 100D is four (4), the number of omni-directional wheels 100A, 100B, 100C, and 100D is not limited to 4, and may be three (3) or five (5) or more.

According to an embodiment of the disclosure, an omni-directional wheel and a moving device including the same may provide a structure of absorbing an impact (i.e., an impact force) applied to peripheral wheels, thereby improving impact resistance performance.

According to an embodiment of the disclosure, an omni-directional wheel and a moving device including the same may be configured to improve flexibility in selecting a wide range of materials of a peripheral wheel therein, may result in a lightweight design, and may facilitate the tasks of replacing parts.

While embodiments have been shown and described above, it will be apparent to those skilled in the art that modifications and variations could be made without departing from the scope of the present disclosure, as defined by the appended claim.

What is claimed is:

1. An omni-directional wheel comprising:
 a center wheel configured to rotate about a first rotation axis extending in a first direction;
 a plurality of peripheral wheels arranged along a circumference of the center wheel and configured to rotate about a second rotation axis extending in a second direction different from the first direction; and
 a plurality of variable supports provided on the center wheel and configured to respectively support the plurality of peripheral wheels,
 wherein each of the plurality of variable supports comprises a support frame extending in a direction away from the first rotation axis of the center wheel and supporting a rotating shaft of a peripheral wheel of the plurality of peripheral wheels,
 the center wheel comprises a plurality of first grooves, each of the plurality of first grooves configured to receive at least a portion of the support frame, and
 at least one of the plurality of variable supports is configured to absorb, when an impact force is applied to at least one of the plurality of peripheral wheels being supported by the at least one of the plurality of variable supports, the impact force by changing a distance between the center wheel and the at least one of the plurality of peripheral wheels.

2. The omni-directional wheel of claim 1, wherein each of the plurality of variable supports comprises:
 an elastic part configured to exert an elastic force to the support frame in the direction away from the first rotation axis of the center wheel.

3. The omni-directional wheel of claim 2, wherein the support frame comprises:
 an insertion portion being inserted into a first groove of the plurality of first grooves; and
 a protrusion portion extending from the insertion portion in the direction away from the first rotation axis of the center wheel and protruding outward from the insertion portion.

4. The omni-directional wheel of claim 3, wherein a first side surface of the insertion portion and a second surface of the first groove facing the first side surface of the insertion portion are parallel in a direction in which the protrusion portion extends from the insertion portion, and
 wherein a width of the first groove corresponds to a thickness of the insertion portion.

5. The omni-directional wheel of claim 3, wherein the support frame further comprises a rib provided on the protrusion portion.

6. The omni-directional wheel of claim 3, wherein the support frame further comprises a stopper configured to prevent separation of the support frame from the first groove of the center wheel.

7. The omni-directional wheel of claim 2, wherein the elastic part comprises at least one of rubber or a fluid.

8. The omni-directional wheel of claim 7, wherein the elastic part is positioned to support an end portion of the support frame facing the first rotation axis of the center wheel.

9. The omni-directional wheel of claim 8, wherein the elastic part comprises a single body configured to exert the elastic force to the support frame of each of the plurality of variable supports.

10. The omni-directional wheel of claim 3, wherein the center wheel further comprises a second groove into which the elastic part is inserted.

11. The omni-directional wheel of claim 1, wherein a material of the center wheel is different from that of the support frame.

12. The omni-directional wheel of claim 11, wherein the support frame has a strength greater than that of the center wheel.

13. A moving device comprising:
a moving body; and
a plurality of omni-directional wheels arranged along a periphery of the moving body to move the moving body in multiple directions,
wherein each of the plurality of omni-directional wheels comprises:
a center wheel configured to rotate about a first rotation axis extending in a first direction;
a plurality of peripheral wheels arranged along a circumference of the center wheel and configured to rotate about a second rotation axis extending in a second direction different from the first direction; and
a plurality of variable supports provided on the center wheel and configured to respectively support the plurality of peripheral wheels,
wherein each of the plurality of variable supports comprises a support frame extending in a direction away from the first rotation axis of the center wheel and supporting a rotating shaft of a peripheral wheel of the plurality of peripheral wheels,
the center wheel comprises a plurality of first grooves, each of the plurality of first grooves configured to receive at least a portion of the support frame, and
at least one of the plurality of variable supports is configured to absorb, when an impact force is applied to at least one of the plurality of peripheral wheels being supported by the at least one of the plurality of variable supports, the impact force by changing a distance between the center wheel and the at least one of the plurality of peripheral wheels.

14. The moving device of claim 13, wherein a first omni-directional wheel of the plurality of omni-directional wheels is arranged symmetrically with a second omni-directional wheel of the plurality of omni-directional wheels with respect to the moving body.

15. The moving device of claim 13, wherein each of the plurality of variable supports comprises:
an elastic part configured to exert an elastic force to the support frame in the direction away from the first rotation axis of the center wheel.

16. The moving device of claim 13, wherein the support frame comprises:
an insertion portion being inserted into a first groove of the plurality of first grooves; and
a protrusion portion extending from the insertion portion in the direction away from the first rotation axis of the center wheel and protruding outward from the insertion portion.

17. The moving device of claim 16, a first side surface of the insertion portion and a second surface of the first groove facing the first side surface of the insertion portion are parallel in a direction in which the protrusion portion extends from the insertion portion, and
wherein a width of the first groove corresponds to a thickness of the insertion portion.

18. The moving device of claim 15, wherein the elastic part comprises at least one of rubber or a fluid.

19. The omni-directional wheel of claim 1, wherein each peripheral wheel of the plurality of peripheral wheels is of approximately a same diameter.

20. The omni-directional wheel of claim 1, wherein an angle between the second direction and the first direction is between 30 degrees and 60 degrees.

* * * * *